(12) United States Patent
Yeom et al.

(10) Patent No.: US 11,169,033 B2
(45) Date of Patent: Nov. 9, 2021

(54) BASE RESISTANCE CANCELLATION METHOD AND RELATED METHODS, SYSTEMS, AND DEVICES

(71) Applicant: Microchip Technology Incorporated, Chandler, AZ (US)

(72) Inventors: Hyunsoo Yeom, Chandler, AZ (US); Cheng Xu, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 407 days.

(21) Appl. No.: 16/105,206

(22) Filed: Aug. 20, 2018

(65) Prior Publication Data

US 2019/0353532 A1    Nov. 21, 2019

Related U.S. Application Data (60) Provisional application No. 62/671,962, filed on May 15, 2018.

(51) Int. Cl.
  *G01K 7/01* (2006.01)
  *G01K 15/00* (2006.01)
  *G01K 7/16* (2006.01)

(52) U.S. Cl.
  CPC .................... *G01K 7/16* (2013.01)

(58) Field of Classification Search
  USPC .............. 374/1, 178, 172; 327/513
  See application file for complete search history.

(56) References Cited

U.S. PATENT DOCUMENTS

| | | | |
|---|---|---|---|
| 6,554,469 B1 | 4/2003 | Thomson et al. | |
| 7,010,440 B1 | 3/2006 | Lillis et al. | |
| 7,524,109 B2 | 4/2009 | Gardner et al. | |
| 7,648,271 B2 | 1/2010 | Doorenbos et al. | |
| 7,701,239 B2 | 4/2010 | Kobayashi | |
| 8,096,707 B2 * | 1/2012 | Raychowdhury | G01K 7/015 374/178 |
| 9,121,768 B2 | 9/2015 | Raychowdhury et al. | |
| 9,335,223 B2 | 5/2016 | Ash et al. | |
| 9,395,253 B2 * | 7/2016 | Ash | G01K 7/01 |
| 2008/0259989 A1 | 10/2008 | Doorenbos et al. | |
| 2008/0259999 A1 | 10/2008 | Gardner et al. | |
| 2009/0190629 A1 * | 7/2009 | Fang | G01K 7/01 374/185 |

OTHER PUBLICATIONS

"±1° C. Temperature Monitor with Series Resistance Cancellation," ON Semiconductor, NVT210/D, May 2015, pp. 1-20.
International Search Report received for PCT Patent Application No. PCT/US19/29213, dated Sep. 12, 2019, 4 pages.
International Written Opinion for International Application No. PCT/US2019/029213, dated Sep. 12, 2019, 9 pages.

* cited by examiner

*Primary Examiner* — Mirellys Jagan
(74) *Attorney, Agent, or Firm* — TraskBritt (57) ABSTRACT

Methods, systems and devices of the present disclosure involve techniques for cancelling base resistance error otherwise present in remote temperature sensors such as remote diode temperature sensors. In one or more embodiments, measurement logic configured to determine a temperature of or near a remote temperature sensor may be configured to determine an error cancelling coefficient and to calculate a temperature value, at least in part, responsive to the error cancelling coefficient. In some cases, error cancelling coefficients may be determined using one or more calibration techniques.

14 Claims, 6 Drawing Sheets

BASE RESISTANCE CANCELLATION METHOD AND RELATED METHODS, SYSTEMS, AND DEVICES

CROSS-REFERENCE TO RELATED APPLICATION

This application claims the benefit under 35 U.S.C. § 119(e) of U.S. Provisional Patent Application Ser. No. 62/671,962, filed May 15, 2018, the disclosure of which is hereby incorporated herein in its entirety by this reference.

TECHNICAL FIELD

Embodiments of this disclosure relate, generally, to temperature sensing and, more specifically, some embodiments relate to remote temperature sensing.

BACKGROUND

Remote temperature sensors are commonly used in telecommunication equipment (switches and routers), servers, personal computers, tablet computers, mobile phones, automotive infotainment systems, batteries, and high-end displays. They are often integrated with the monitored device (e.g., a computer processing unit). In some typical remote temperature sensors, the actual sensor is a bipolar-junction-transistor (BJT) or diode that is affected in some known and somewhat predictable way by the temperature of the monitored device, environment, etc.

In the case of a PNP BJT remote temperature sensor, a collector current is primarily due to charge that is injected (i.e., an electrical current) at an emitter into the base and diffuses toward the collector, and by design, the base-emitter junction has a predictable transfer function that is dependent on temperature. Accordingly, in theory a temperature of the sensor can be calculated by forward-biasing the base-emitter junction and measuring the base-emitter voltage ($V_{BE}$).

However, The amount of current that flows into the base is controlled by the forward gain of the BJT ($\beta_F$), which may cause unwanted measurement error due to the voltage drops over a base resister ($R_b$) due to an error current ($I_B$). The error current $I_B$ may flow out of the base and affect the amount of current that flows through the collector ($I_C$), and more generally affect the base-emitter voltage $V_{BE}$. Consequently, $V_{BE}$ may vary according to the base current $I_B$ and introduce error into a temperature calculation based on an expected transfer function that has been affected by $R_b$.

The base-emitter voltage ($V_{BE}$) may vary both linearly and non-linearly because of the base-resistance. The variation is referred to, in this disclosure, as the base-resistance error. If the base resistance is known, then the relationship of the base-emitter junction could be defined and there would be no base-resistance error. However, most remote-temperature sensing circuitry is designed to work with a variety of temperature sensors, which may be selected to suit the dynamic range requirements of a specific application.

One typical technique for accounting for the base-resistance error is called "sense then dump." A second sensor measures the base current $I_B$ and, typically using another current source, injects (i.e., "dumps") an equivalent amount of current into the emitter-base junction to try and preserve the base-emitter relationship. The second sensor typically tries to track changes in a forward current gain (called Beta), which varies with current density, to determine $I_B$. However, it is now known to the inventors of this disclosure that the "dump" simply injects the non-linear variation into $I_E$, which renders imperfect any emitter-side routing cancellation. In other words, "sense then dump" simply shifts the error, it does not cancel it.

Moreover, it is also now known to the inventors of this disclosure that the base resistance error may be aggravated by the resistance of a sensing line that is operatively coupled to the base of a BJT and a base-resistor $R_b$.

Thus, the inventors of this disclosure have recognized a need for a general technique to cancel or account for the base-resistance error in remote temperature sensors that does not suffer from the deficiencies of typical techniques, including those noted above.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings may be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

Thus, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

It should be understood that any reference to an element herein using a designation such as "first," "second," and so forth does not limit the quantity or order of those elements, unless such limitation is explicitly stated. Rather, these designations are used herein as a convenient method of distinguishing between two or more elements or instances of an element. Thus, a reference to first and second elements does not mean that only two elements can be employed or that the first element must precede the second element in some manner. Also, unless stated otherwise a set of elements may comprise one or more elements. Likewise, sometimes elements referred to in the singular form may also include one or more instances of the element.

As used herein, the terms "substantially" and "about" in reference to a given parameter, property, or condition means and includes to a degree that one of ordinary skill in the art would understand that the given parameter, property, or condition is met with a degree of variance, such as within acceptable manufacturing tolerances. For example, a parameter that is substantially or about a specified value may be at least about 90% the specified value, at least about 95% the specified value, at least about 99% the specified value, or even at least about 99.9% the specified value.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts may be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Figure 1:
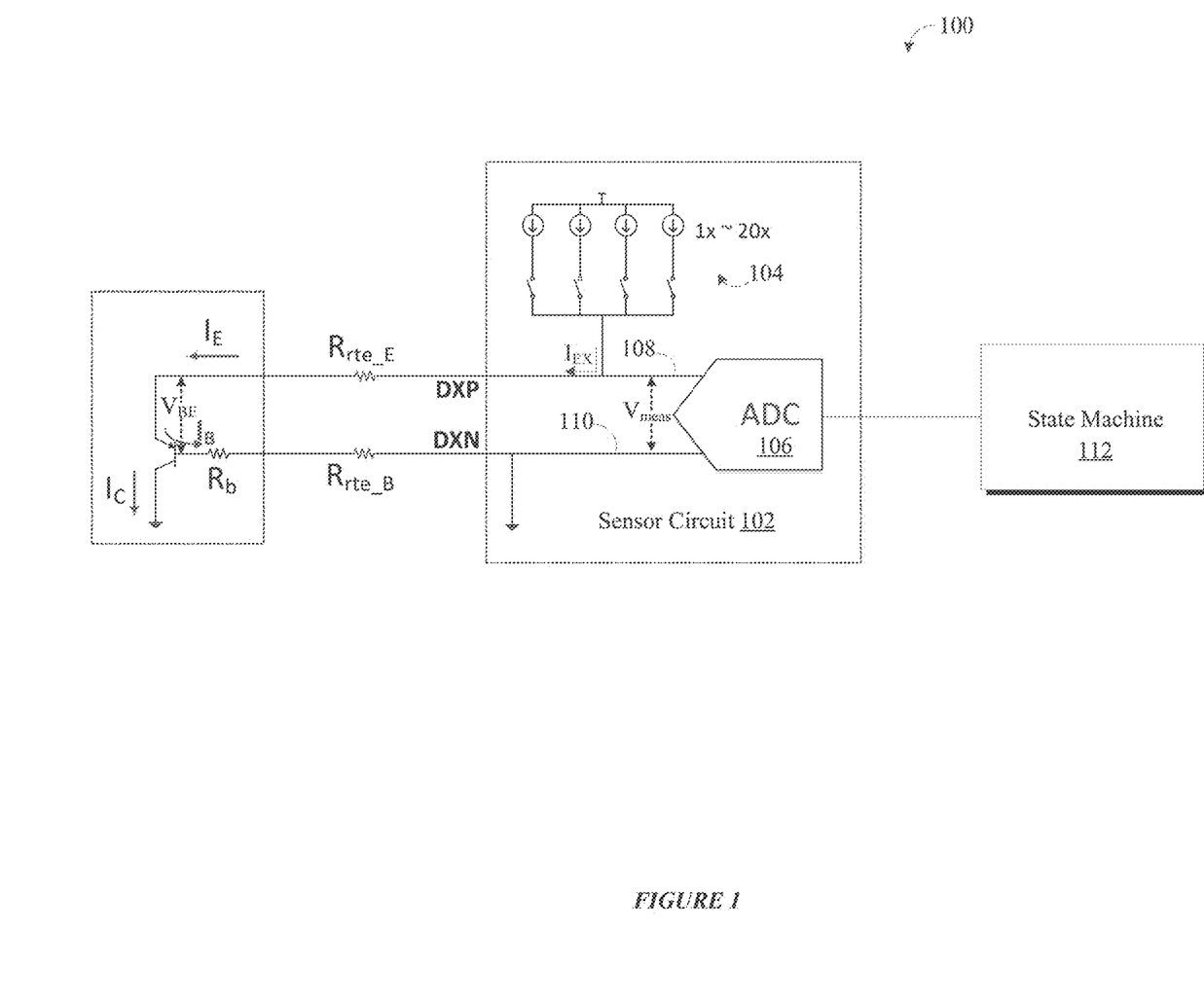
FIG. 1 shows an embodiment of a remote temperature sensor system configured to implement base-resistance cancellation techniques in accordance with one or more embodiments of this disclosure.

FIG. 1 shows an embodiment of a remote temperature sensor system 100 that is configured to implement base-resistance cancellation techniques in accordance with one or more embodiments of this disclosure. In FIG. 1, current biasing circuit 104 is four biasing current sources used in the examples, above, namely 1x, 2x, 10x and 20x. In one or more embodiments, sensor circuit 102 may include a range of current sources that can be configured according to a desired set of biasing currents for a calibration process. Analog-to-digital converter (ADC) 106 is operatively coupled to the emitter sense line (DXP) 108 and the base sense line (DXN) 110 and configured to measure the voltage drop across those lines, for example, by way of a differential input. In one or more embodiments, ADC 106 may be a sigma-delta ADC. State machine 112 may be configured to receive the output of the ADC 106, and to perform the calculations of the error current cancelling coefficient and temperature in accordance with one or more embodiments of the disclosure.

Figure 2:
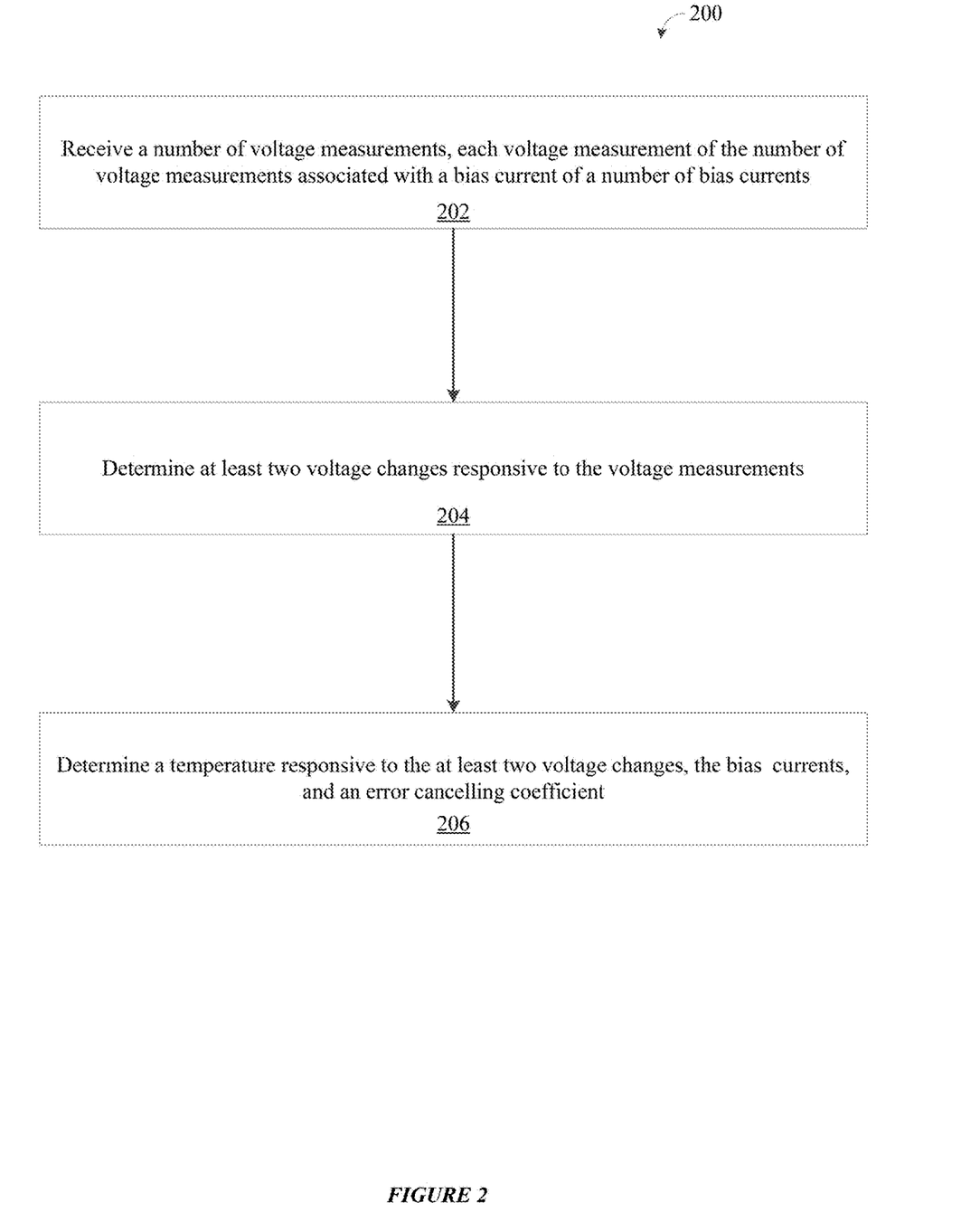
FIG. 2 shows a base-resistance error cancelling technique, in accordance with one or more embodiments.

One embodiment of this disclosure relates, generally, to a technique for cancelling a base-resistance error from a temperature calculation where the route resistance of the sensing lines ($R_{rte\_E}$ and $R_{rte\_B}$) are assumed to be substantially the same ($R_{rte}=R_{rte\_E}=R_{rte\_B}$) or within some acceptable difference (e.g., about 1Ω). FIG. 2 shows an example base-resistance error cancelling technique 200, in accordance with one or more embodiments. In operation 202, a number of voltage measurements are received, where each voltage measurement is associated with a known bias current. The bias currents are all different, but proportional to each other. In one embodiment, the bias currents are multiples of a standard current (1x, 2x, 3x, 4x . . . 10x . . . 20x, where 'x' is the standard current). In operation 204, at least two changes to $V_{BE}$ ($\Delta V_{BE}$) are calculated, and in operation 206, the calculated changes are used to determine an error current cancelling coefficient (here, $R_{rte}+R_b$) that may be used in a temperature calculation to compensate for the base-resistance error.

What follows is a more detailed explanation of calculations that may be used to determine the error current cancelling coefficient for one or more embodiments of the disclosure.

Assume, a case where the biasing currents are 1x, 2x, 10x and 20x the standard current. Further, assume that the forward current gain $\beta_F$ at the BJT sensor is known for each biasing current (i.e., $\beta_{F1}$, $\beta_{F2}$, $\beta_{F10}$, and $\beta_{F20}$) or is calculated using the technique described below. Then, Each voltage measurement may be expressed in terms of Equation 1:

Equation 1
$$V_{meas} = \Delta V_{BE} + \left(20I_{E1} \cdot \left(\frac{R_{ser,B}}{1+\beta_{F10}} - \frac{R_{ser,B}}{1+\beta_{F20}}\right) + 2I_{E1} \cdot \left(\frac{R_{ser,B}}{1+\beta_{F2}} - \frac{R_{ser,B}}{1+\beta_{F1}}\right)\right)$$

Where, $R_{ser\_B} = R_B + R_{rte\_B}$

Equation 1 may be re-written to isolate the base-resistance due to $R_B + R_{rte\_B}$ as shown in Equation 2:

Equation 2
$$V_{meas} = \frac{nkT}{q}\left[2\ln\left(\frac{I_{E10}\beta_{F10}(1+\beta_{F1})}{I_{E1}\beta_{F1}(1+\beta_{F10})}\right) - \ln\left(\frac{I_{E20}\beta_{F20}(1+\beta_{F2})}{I_{E2}\beta_{F2}(1+\beta_{F20})}\right)\right] - \left(\frac{2I_{E10}}{1+\beta_{F10}} - \frac{2I_{E1}}{1+\beta_{F1}} - \frac{I_{E20}}{1+\beta_{F20}} + \frac{I_{E2}}{1+\beta_{F2}}\right) \cdot (R_b + R_{rte,B})$$

Notably, and as explained above, base resistance error is not cancelled merely by using multiple biasing currents because the forward gain ($\beta_F$) variation introduces non-linear error. Because the forward gain $\beta F_x$ is known for each biasing current $I_{EX}$ the only two unknowns are $R_B$ and $R_{rte\_B}$, so the equations for $\Delta V_{BE}$ may be used to solve for $R_{rte}$ and $R_B$, as shown in Equation 3 and Equation 4, below, and arrive at the error current cancelling coefficient:

Equation 3
$$a \cdot R_{rte} + b \cdot R_b = c$$
$$d \cdot R_{rte} + e \cdot R_b = f \implies R_{rte} = \frac{ce-bf}{ae-bd}$$
$$R_b = \frac{af-cd}{ae-bd}$$

Where a, b, c, d, and f are:

Equation 4
$$a = I_{E10}\left(\frac{2+\beta_{F10}}{1+\beta_{F10}}\right) - I_{E1}\left(\frac{2+\beta_{F1}}{1+\beta_{F1}}\right), \quad b = \frac{I_{E10}}{1+\beta_{F10}} - \frac{I_{E1}}{1+\beta_{F1}},$$
$$c = \Delta V_{BE(10-1)} - \frac{nkT}{q}\ln\left(\frac{I_{E10}\beta_{F10}(1+\beta_{F1})}{I_{E1}\beta_{F1}(1+\beta_{F10})}\right)$$
$$d = I_{E20}\left(\frac{2+\beta_{F20}}{1+\beta_{F20}}\right) - I_{E2}\left(\frac{2+\beta_{F2}}{1+\beta_{F2}}\right), \quad e = \frac{I_{E20}}{1+\beta_{F20}} - \frac{I_{E2}}{1+\beta_{F2}},$$
$$f = \Delta V_{BE(20-2)} - \frac{nkT}{q}\ln\left(\frac{I_{E20}\beta_{F20}(1+\beta_{F2})}{I_{E2}\beta_{F2}(1+\beta_{F20})}\right)$$

With $R_{rte}$ and $R_B$ expressed as constants the values can be plugged into Equation 5 to solve for the temperature T:

Equation 5
$$T = \frac{q\left[V_{in} + \left(\frac{2I_{E10}}{1+\beta_{F10}} - \frac{2I_{E1}}{1+\beta_{F1}} - \frac{I_{E20}}{1+\beta_{F20}} - \frac{I_{E2}}{1+\beta_{F2}}\right) \cdot (R_b + R_{rte})\right]}{nk\left[2\ln\left(\frac{I_{E10}\beta_{F10}(1+\beta_{F1})}{I_{E1}\beta_{F1}(1+\beta_{F10})}\right) - \ln\left(\frac{I_{E20}\beta_{F20}(1+\beta_{F2})}{I_{E2}\beta_{F2}(1+\beta_{F20})}\right)\right]}$$

The result of plugging $R_{rte}$ and $R_B$ into Equation 5 is Equation 6:

Equation 6
$$T = \frac{\Delta V_{BE(10-1)}\left[2 + \frac{B(d-e)}{A}\right] - \Delta V_{BE(20-2)}\left[1 + \frac{B(a-b)}{A}\right]}{\left[\left(2 + \frac{B(d-e)}{A}\right)\frac{nk}{q}\ln\left(\frac{I_{E10}\beta_{F10}\cdot(1+\beta_{F1})}{I_{E1}\beta_{F1}\cdot(1+\beta_{F10})}\right) - \left(1 + \frac{B(a-b)}{A}\right)\frac{nk}{q}\ln\left(\frac{I_{E20}\beta_{F20}(1+\beta_{F2})}{I_{E2}\beta_{F2}(1+\beta_{F20})}\right)\right]}$$

One embodiment of the disclosure relates, generally, to a technique for cancelling a base-resistance error from a temperature calculation where there is a route resistance mismatch for the sensing lines ($R_{rte\_E} \neq R_{rte\_B}$).

Figure 3:
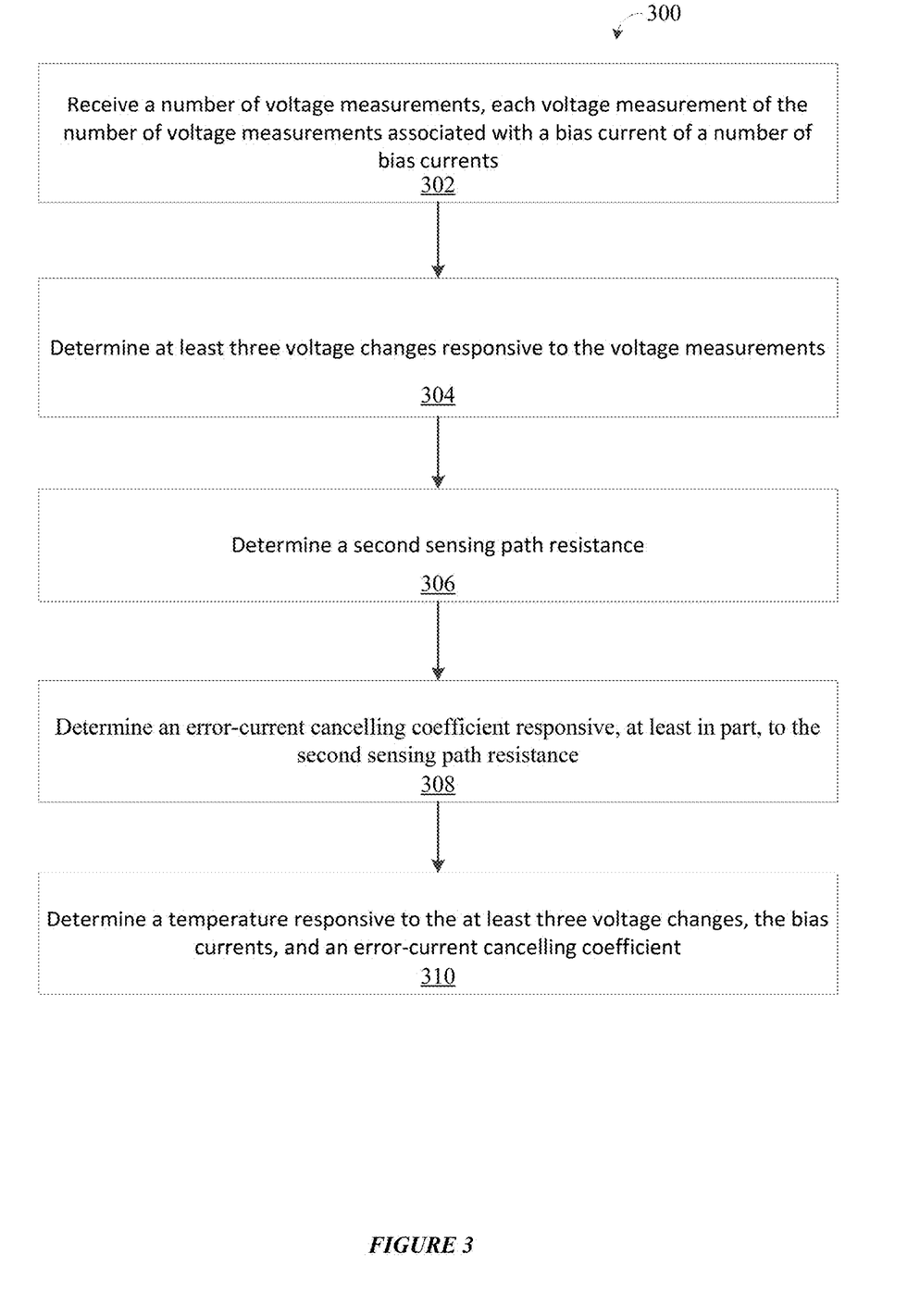
FIG. 3 shows a base-resistance error cancelling technique, in accordance with one or more embodiments.

FIG. 3 shows an example base-resistance error cancelling technique 300, in accordance with one or more embodiments. In operation 302, a number of voltage measurements are received, where each voltage measurement is associated with a known bias current. The bias currents are all different, but proportional to each other. In one embodiment, the bias currents are multiples of a standard current (1x, 2x, 3x, 4x . . . 10x . . . 20x). In operation 304, at least three changes to $V_{BE}$ ($\Delta V_{BE}$) are determined. In operation 306, the at least three changes to $V_{BE}$ are used to determine the emitter route resistance $R_{rte\_E}$. In operation 308, an error current cancelling coefficient ($R_{rte}+R_b$) is determined responsive, at least in part, to the emitter route resistance $R_{rte\_E}$. The error cancelling coefficient may be used in a temperature calculation to compensate for the base-resistance error. In operation 310, a temperature may be determined responsive to the at least three voltage changes, the bias currents, and an error-current cancelling coefficient.

Figure 4:
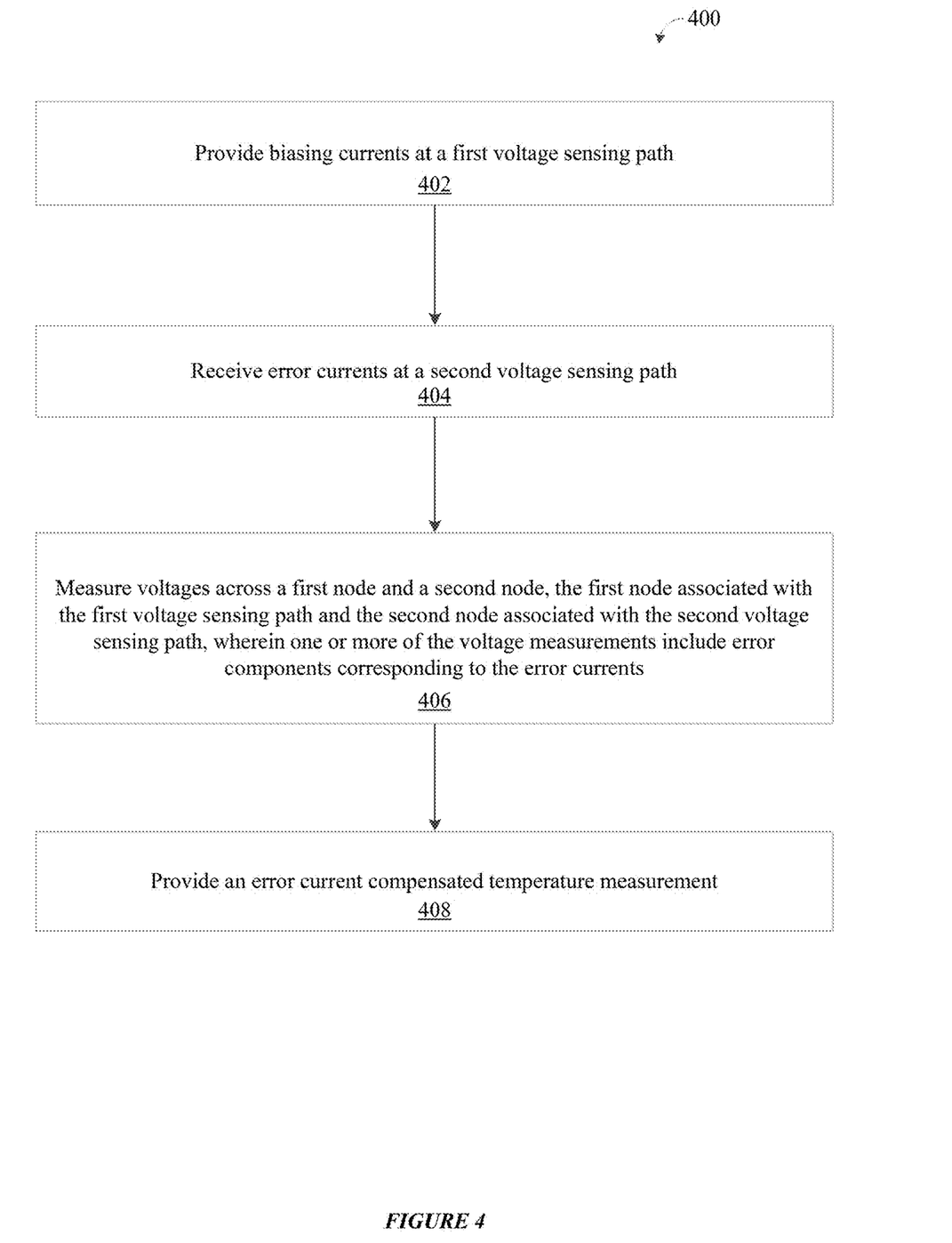
FIG. 4 shows a temperature measurement technique, in accordance with one or more embodiments.

One or more embodiments of the disclosure relate, generally, to a technique for measuring temperature at remote temperature sensor. FIG. 4 shows an example of a measurement technique 400, in accordance with one or more embodiments. In operation 402, a number of biasing currents are provided at a first voltage sensing path. In one embodiment, the first voltage sensing path may be an emitter sensing line. In operation 404, one or more error currents are received at a second voltage sensing path. In one embodiment, the second voltage sensing path may be a base sensing line. In operation 406, voltages are measured across a first node and a second node. The first node may be associated with the first voltage sensing path and the second node may be associated with the second voltage sensing path. The voltage measurement includes error components that correspond to error currents. In one embodiment, there are four biasing currents and four voltage measurements. In one embodiment, there are six biasing currents and six voltage measurements. In operation 408, an error current compensated temperature measurement is output. In one embodiment, the error current compensated measurement is calculated using an error current cancelling coefficient according to embodiments described with reference to Equations 1 through 6, above.

Figure 5:
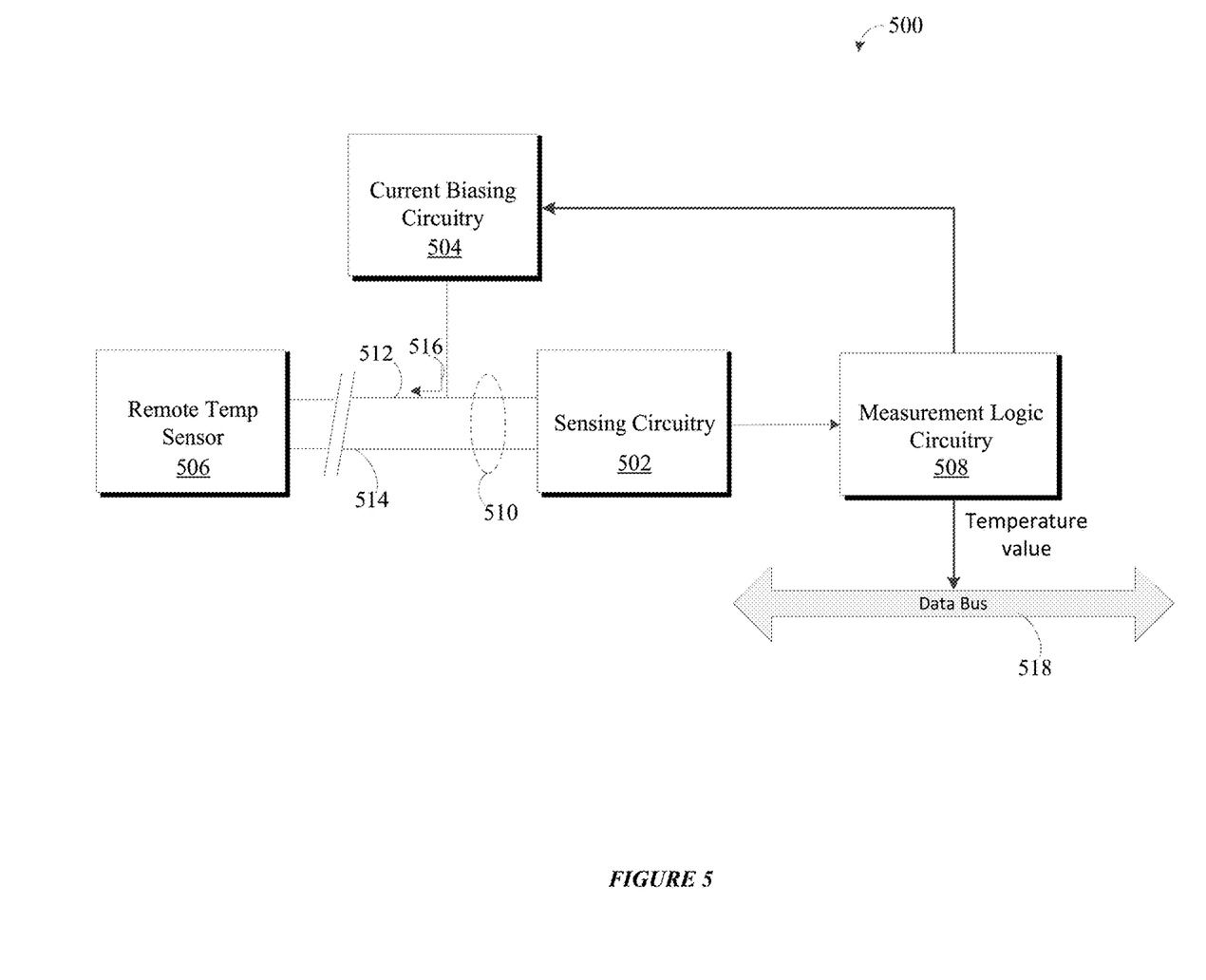
FIG. 5 shows an embodiment of a remote temperature sensor system configured to implement base-resistance cancellation techniques, in accordance with one or more embodiments.

FIG. 5 shows an embodiment of a remote temperature sensor system 500 that is configured to implement base-resistance cancellation techniques, in accordance with one or more embodiments. In one or more embodiments, remote temperature sensor system 500 may include remote temperature sensor 506, sensing circuitry 502, measurement logic circuitry 508, and current biasing circuitry 504. In one embodiment, remote temperature sensor 506 may be a bipolar junction transistor (BJT), but, in another embodiment, it may also be a diode. Remote temperature sensor 506 may be operatively coupled to sensing paths 510 of sensing circuitry 502, which is configured to measure voltage drops across the two sensing paths 512 and 514 of sensing paths 510. First sensing paths 512 is operatively coupled to current biasing circuitry 504, which is configured to provide one or more biasing currents 516 to first sensing path 512. Sensing circuitry 502 is configured to measure voltage drops across the sensing paths 510 caused by the biasing currents provided by current biasing circuitry 504. Sensing circuitry 502 may be configured to measure those voltage drops by any means known to one of ordinary skill in the art, including using an analog to digital converter to provide digital signal indicative of voltage drops. Sensing circuitry 502 may be configured to output digital signals that are indicative of voltage drops at the sensing paths 510, and measurement logic circuitry 508 may be configured to determine an error current cancelling coefficient and a temperature responsive to the voltage drops, biasing currents, and an error current cancelling coefficient(s). In one or more embodiments, measurement logic circuitry 508 may be a post-processing algorithm unit or a state machine (e.g., adders, flip flops, multiplexers, etc., implementing a digital logic circuit equivalent to the calculations described herein). In one or more embodiments, measurement logic circuitry 508 may be a host processor on a microcontroller. In one or more embodiments, remote temperature sensor 506 may be operatively coupled to a data bus 518, and the temperature may be provided as a digital signal at the data bus 518. In one embodiment, the data bus 518 may be a peripheral data bus. In one embodiment, the peripheral data bus may be a UART, USART, or I²C bus.

Figure 6:
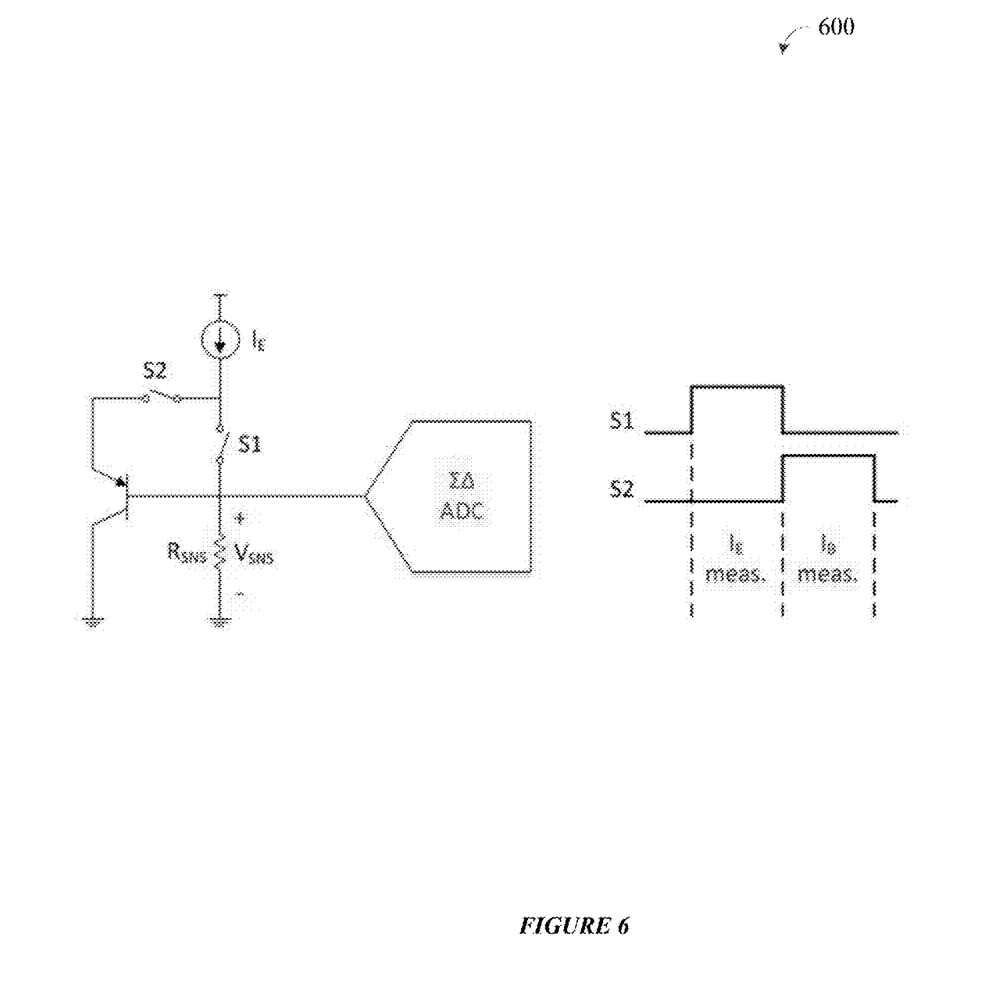
FIG. 6 shows an embodiment of a calibration circuit that may be used to determine a forward current gain, in accordance with one or more embodiments.

In one or more embodiments, if not already known, then forward current gain $\beta_F$ may be calibrated using calibration circuit 600 shown in FIG. 6. $V_{SNS}$ may be measured responsive to current $I_E$ and then immediately after responsive to current $I_B$. The forward current gain $\beta_F$ may then be determined using Equation 7:

$$\beta_F = \frac{I_E}{I_B} - 1 = \frac{V_{SNS}(I_E)}{V_{SNS}(I_B)} - 1 \qquad \text{Equation 7}$$

One of ordinary skill in the art will appreciate that there are many benefits and advantages associated with implementation of embodiments of the disclosure. For example, improving the accuracy and precision of temperature measurements of remote temperature sensors. Long sense lines may be enabled by compensating for the route resistance, which, in the absence of a cancellation methods according to embodiments of the disclosure, would cause significant base resistance error and exacerbate the forward gain variation. This is a significant advantage over typical techniques such as the "sense and dump" technique described, above.

One or more additional non-limiting embodiments of the disclosure include:

Embodiment 1

A sensing circuitry for a remote diode temperature sensor, comprising: a biasing circuitry configured to emit one or more biasing currents; a sensing circuitry configured to measure voltages across a pair of nodes while the biasing currents are being emitted; a measurement logic circuitry configured to: determine changes in voltage across the pair of nodes responsive to the measured voltages; determine an error current cancelling coefficient responsive to the determined changes in voltage; and calculate a corrected temperature responsive to the voltage measurements and the error cancelling coefficient to arrive at a final temperature.

Embodiment 2

The sensing circuitry of Embodiment 1, wherein the one or more biasing currents comprises pairs of biasing currents.

Embodiment 3

The sensing circuitry of any of Embodiments 1 and 2, wherein each biasing current of the one or more biasing currents are proportional to each other biasing current of the one or more biasing currents.

Embodiment 4

The sensing circuitry of any of Embodiments 1 to 3, wherein each biasing current of the one or more biasing currents is different than each other biasing current of the one or more biasing currents.

Embodiment 5

The sensing circuitry of any of Embodiments 1 to 4, wherein each biasing current of the one or more biasing currents is a multiple of a standard current.

Embodiment 6

The sensing circuitry of any of Embodiments 1 to 5, wherein the multiple is selected from a group consisting of 1x to 20x, inclusive.

Embodiment 7

The sensing circuitry of any of Embodiments 1 to 6, wherein the biasing circuitry is configured to emit a first biasing current that is a first multiple of a standard current, and the sensing circuitry is configured to measure a first voltage across the pair of nodes while the first biasing current is being emitted.

Embodiment 8

The sensing circuitry of any of Embodiments 1 to 7, wherein the biasing circuitry is configured to emit a second biasing current that is a second multiple of a standard current, and the sensing circuitry is configured to measure a second voltage across the pair of nodes while the second biasing current is being emitted.

Embodiment 9

The sensing circuitry of any of Embodiments 1 to 8, wherein the measurement logic circuitry is configured to:

determine a route resistance associated with at least one sensing path operatively coupled to the pair of nodes responsive to the determined changes in voltage; and determine a base resistance responsive to the determined changes in voltage.

Embodiment 10

The sensing circuitry of any of Embodiments 1 to 9, wherein the error current cancelling coefficient is a sum of the route resistance and the base resistance.

Embodiment 11

A sensing circuitry for a remote diode temperature sensor, comprising: a biasing circuitry configured to emit one or more biasing currents; a sensing circuitry configured to measure voltages across a pair of nodes while the biasing currents are being emitted; a measurement logic circuitry configured to: determine changes in voltage across the pair of nodes responsive to the measured voltages; determine a sensing path resistance; determine an error current cancelling coefficient responsive, at least in part, to the sensing path resistance; and calculate a corrected temperature responsive to the voltage measurements and the error cancelling coefficient to arrive at a final temperature.

Embodiment 12

The sensing circuitry of Embodiment 11, wherein the measurement logic circuitry is configured to determine the sensing path resistance by: determining a sensing path resistance of a first sensing path; and determining a sensing path resistance of a second sensing path.

Embodiment 13

The sensing circuitry of any of Embodiments 11 and 12, wherein the biasing current circuitry is operably coupled to the first sensing path and is configured to emit the one or more biasing currents at the first sensing path.

Embodiment 14

The sensing circuitry of any of Embodiments 11 to 13, wherein the sensing circuitry is configured to receive a return current from the second sensing path, the return current having a current level that is inductive of the one or more biasing currents.

Embodiment 15

A method of cancelling a base-resistance error from a temperature calculation based on a remote temperature sensor, comprising: providing a number of bias currents to at least one sensing path of two sensing paths; measuring voltages across the two sensing paths while a number of bias currents are provided to the at least one sensing path; determining at least two voltage changes responsive to the voltage measurements; and determining a temperature responsive to the at least two voltage changes, the bias currents, and an error cancelling coefficient.

Embodiment 16

The method of Embodiment 15, further comprising: measuring a first voltage change across the two sensing paths responsive to a first pair of bias currents; measuring a second voltage change across the two sensing paths responsive to a second pair of bias currents; and determining the error cancelling coefficient responsive to the first voltage change and the second voltage change.

Embodiment 17

The method of any of Embodiments 15 and 16, wherein the first pair of bias currents are each a different multiple of a standard bias current, and the second pair of bias currents are each a different multiple of the standard bias current.

Embodiment 18

The method of any of Embodiments 15 to 17, further comprising: measuring a first voltage change across the two sensing paths responsive to a first pair of bias currents; measuring a second voltage change across the two sensing paths responsive to a second pair of bias currents; measuring a third voltage change across the two sensing paths responsive to a third pair of bias currents; and determining the error cancelling coefficient responsive to the first voltage change, the second voltage change, and the third voltage change.

Embodiment 19

A temperature sensing system, comprising: a remote diode temperature sensor configured to exhibit characteristic changes responsive to environmental temperatures; a biasing circuitry configured to emit one or more biasing currents to at least one sensing path of a pair of sensing paths, the at least one sensing path operatively coupled to the remote temperature sensor; a sensing circuitry configured to measure voltages across the pair of sensing paths while the biasing currents are being emitted; and a measurement logic circuitry configured to: determine changes in voltage across the pair of sensing paths responsive to the measured voltages; determine an error current cancelling coefficient responsive to the determined changes in voltage; and calculate a corrected temperature responsive to the voltage measurements and the error cancelling coefficient to arrive at a final temperature.

Any characterization in this disclosure of something as 'typical,' 'conventional,' or 'known' does not necessarily mean that it is disclosed in the prior art or that the discussed aspects are appreciated in the prior art. Nor does it necessarily mean that, in the relevant field, it is widely known, well-understood, or routinely used.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A sensing circuit for a remote diode temperature sensor, comprising:
   a biasing circuit configured to provide a number of biasing currents to at least one sensing path of two sensing paths associated with a remote temperature sensor;

a sensing circuit configured to measure voltage levels exhibited by a voltage across the two sensing paths while the biasing currents are being provided to the at least one sensing path; and a measurement circuit configured to:
  determine at least two voltage changes responsive to the measured voltages; and
  determine a temperature sensed by the remote temperature sensor responsive to the at least two voltage changes, the bias currents, and an error cancelling coefficient,
wherein the error cancelling coefficient comprises a value for a route resistance of the two sensing paths.

2. The sensing circuit of claim 1, wherein the number of biasing currents comprises pairs of biasing currents.

3. The sensing circuit of claim 1, wherein each biasing current of the number of biasing currents are proportional to each of the other biasing currents of the number of biasing currents.

4. The sensing circuit of claim 3, wherein each biasing current of the number of biasing currents is different than each of the other biasing currents of the one or more biasing currents.

5. The sensing circuit of claim 1, wherein each biasing current of the number of biasing currents is a multiple of a specified current.

6. The sensing circuit of claim 5, wherein the multiple is of the range 1x to 20x, inclusive.

7. The sensing circuit of claim 1, wherein the biasing circuit is configured to provide a first biasing current that is a first multiple of a specified current, and the sensing circuit is configured to measure a first voltage level of the voltage across the two sensing paths while the first biasing current is being provided.

8. The sensing circuit of claim 7, wherein the biasing circuit is configured to provide a second biasing current that is a second multiple of the specified current, and the sensing circuit is configured to measure a second voltage level of a voltage across the two sensing paths while the second biasing current is being provided.

9. The sensing circuit of claim 1, wherein the measurement logic circuit is configured to:
  determine a route resistance associated with the at least one sensing path operatively coupled to the two sensing paths responsive to the determined changes in voltage level; and
  determine a base resistance responsive to the determined changes in voltage level.

10. The sensing circuit of claim 9, wherein the error cancelling coefficient is a sum of the route resistance and the base resistance.

11. A method of cancelling a base-resistance error from a temperature calculation based on a remote temperature sensor, comprising:
  providing a number of bias currents to at least one sensing path of two sensing paths associated with the remote temperature sensor;
  measuring voltage levels exhibited by a voltage across the two sensing paths while the number of bias currents are provided to the at least one sensing path;
  determining at least two voltage level changes responsive to the measured voltage levels; and
  determining a temperature sensed by the remote temperature sensor responsive to the at least two voltage level changes, the bias currents, and an error cancelling coefficient,
wherein the error cancelling coefficient comprises a value for a route resistance of the two sensing paths.

12. The method of claim 11, further comprising:
  measuring a first voltage level change across the two sensing paths responsive to a first pair of bias currents;
  measuring a second voltage level change across the two sensing paths responsive to a second pair of bias currents;
  measuring a third voltage level change across the two sensing paths responsive to a third pair of bias currents; and
  determining the error cancelling coefficient responsive to the first voltage level change, the second voltage level change, and the third voltage level change.

13. The method of claim 11, further comprising:
  measuring a first voltage level change across the two sensing paths responsive to a first pair of bias currents;
  measuring a second voltage level change across the two sensing paths responsive to a second pair of bias currents; and
  determining the error cancelling coefficient responsive to the first voltage level change and the second voltage level change.

14. The method of claim 13, wherein the first pair of bias currents are each a different multiple of a specified bias current, and the second pair of bias currents are each a different multiple of the specified bias current.

* * * * *

UNITED STATES PATENT AND TRADEMARK OFFICE
CERTIFICATE OF CORRECTION

PATENT NO. : 11,169,033 B2
APPLICATION NO. : 16/105206
DATED : November 9, 2021
INVENTOR(S) : Hyunsoo Yeom and Cheng Xu Page 1 of 1

It is certified that error appears in the above-identified patent and that said Letters Patent is hereby corrected as shown below:

In the Specification

Column 7, Line 17, change "paths" to --path--

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*